Nov. 20, 1928.  
J. A. REECE  
1,692,569  
SHEET GLASS DRAWING APPARATUS  
Filed Nov. 30, 1923   2 Sheets-Sheet 1
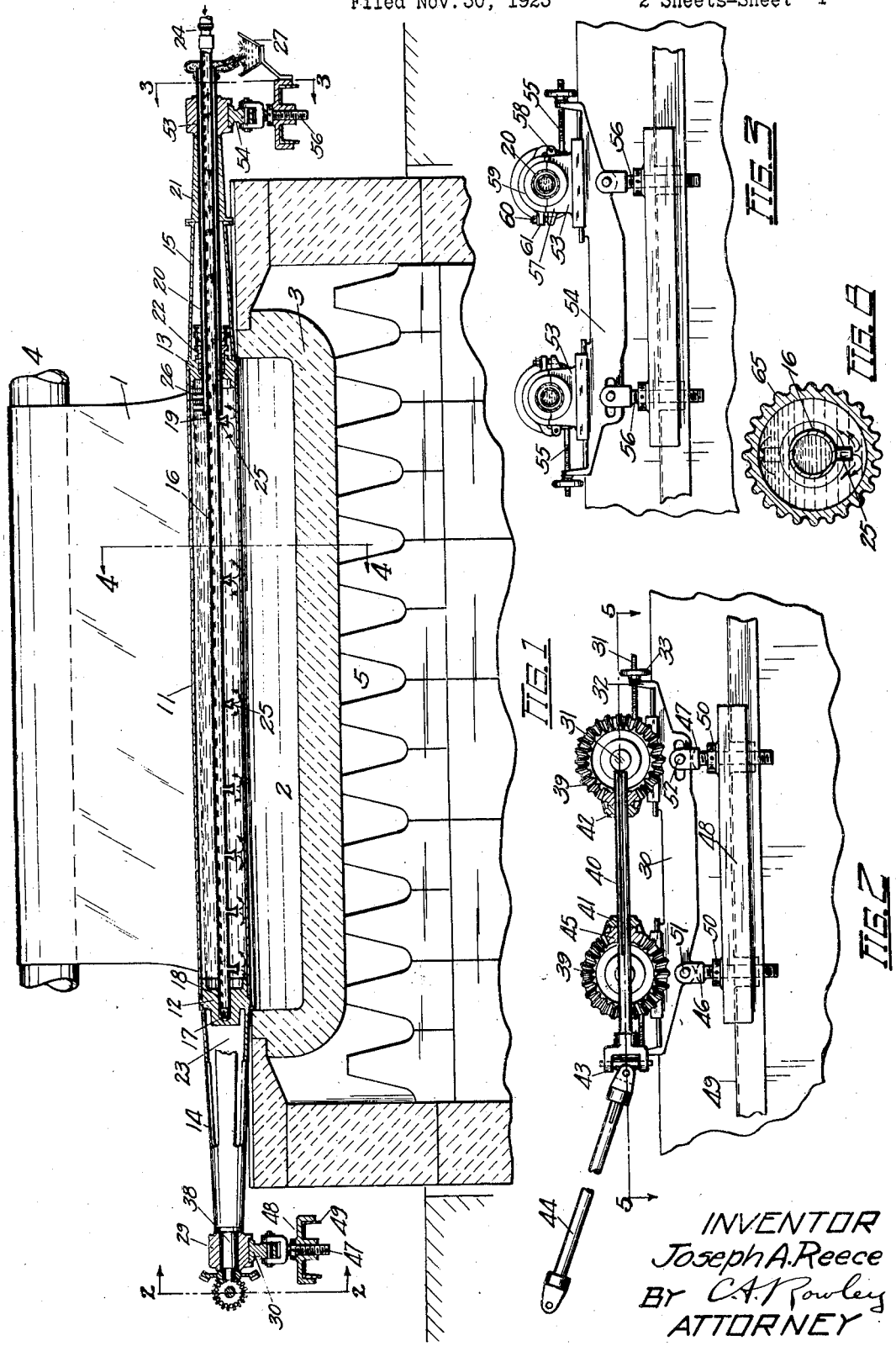
INVENTOR  
Joseph A. Reece  
BY C. A. Rowley  
ATTORNEY Nov. 20, 1928.
J. A. REECE
1,692,569
SHEET GLASS DRAWING APPARATUS
Filed Nov. 30, 1923  2 Sheets-Sheet 2
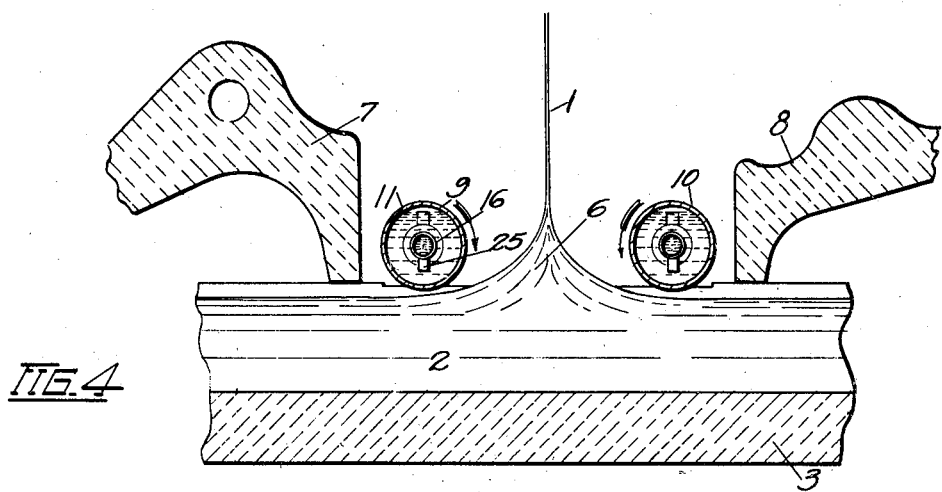
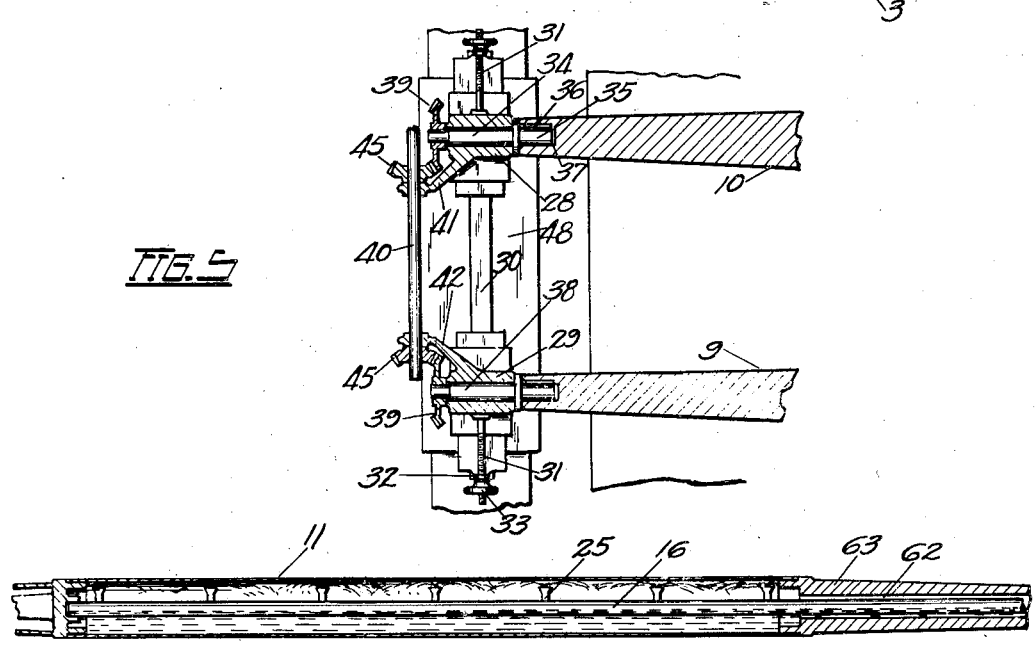
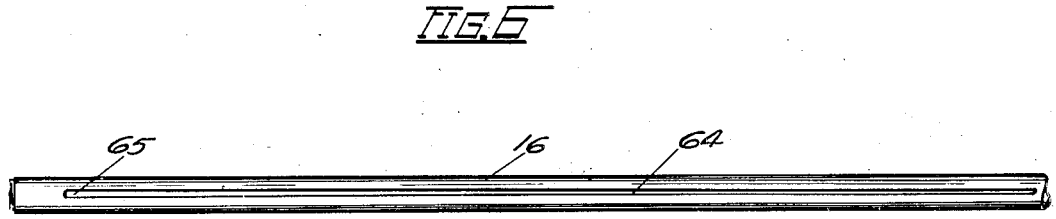
INVENTOR
Joseph A. Reece
BY C. A. Rowley
ATTORNEY Patented Nov. 20, 1928.

1,692,569

UNITED STATES PATENT OFFICE.

JOSEPH A. REECE, OF TOLEDO, OHIO, ASSIGNOR TO THE LIBBEY-OWENS SHEET GLASS COMPANY, OF TOLEDO, OHIO, A CORPORATION OF OHIO.

SHEET-GLASS-DRAWING APPARATUS.

Application filed November 30, 1923. Serial No. 677,658.

This invention relates to improvements in the art of drawing sheet glass, and more particularly to an improved form of cooler, or internally cooled shield, for use adjacent the sheet source.

In certain systems for continuously drawing sheet glass from a pool of molten glass, for example that set forth in the Colburn Patent, 1,248,809, granted December 4, 1917, water-cooled shields are positioned parallel to the sheet sides adjacent the sheet source. These shields are usually of rectangular form, with their sides of greatest dimension positioned parallel to the sheet, and they serve the double function of cooling the glass from which the sheet is drawn, and the sheet itself at its source, to permit a greater drawing speed and hence greater production, and also serve to shield the sheet during its early forming period from the heated air currents from the furnace, and the radiated heat that would otherwise be thrown against the sheet source from the molten glass at either side.

The present invention relates to an improved form of cooler to be substituted for that briefly described above. This new cooler is in the form of a hollow cylinder, and is adapted to be slowly and continuously rotated about its longitudinal axis, so as to constantly present a different portion of its cylindrical surface toward the molten glass from which the heat is being absorbed. Non-rotary means are provided within the cylinders for constantly delivering a cooling fluid to the interior thereof and subsequently removing the more heated portions of this fluid.

The new cooler possesses numerous advantages over the form now commonly in use, among which are an increased cooling capacity; the elimination of dead or stagnant corners within the cooler, whereby the cooler is substantially self-cleaning and less subject to corrosion; a more uniform and equal temperature-regulating capacity at all points throughout the length of the cooler; and a stronger and more rigid construction whereby the tendency to sag at the center, inherent in a stationary shield, is avoided.

The above and other objects and advantages will become apparent from the following detailed description of certain approved forms of apparatus involving the principles of this invention.

In the accompanying drawings:

Fig. 1 is a transverse vertical section through portions of the sheet drawing apparatus, showing one form of the improved cooler in central longitudinal section.

Fig. 2 is an elevation of the cooler rotating mechanism, this view being taken substantially on the line 2—2 of Fig. 1.

Fig. 3 is an elevation of the supporting and adjusting means for the opposite ends of the coolers, this view being taken substantially on the line 3—3 of Fig. 1.

Fig. 4 is a transverse vertical section through the sheet and coolers, taken substantially on the line 4—4 of Fig. 1.

Fig. 5 is a horizontal section taken substantially on the line 5—5 of Fig. 2.

Fig. 6 is a longitudinal section through a modified form of cooler.

Fig. 7 is a detail of a modified form of feed pipe for the cooling fluid.

Fig. 8 is a transverse section through a modified form of the cooling cylinder.

In the sheet-drawing system here shown, the glass sheet 1 is drawn upwardly from the mass of molten glass 2 in receptacle 3 and then bent into the horizontal plane over a roller 4. The receptacle 3 is mounted above a heating chamber 5, for maintaining the glass at the proper working temperature, and all of the surface glass in the receptacle, except that immediately adjacent either side of the source 6 of sheet 1, is enclosed by the cover-tiles 7 and 8. A pair of internally cooled shields 9 and 10 are positioned substantially parallel to the sides of sheet 1 and closely adjacent the surface of the molten glass 2. These shields serve to protect the sheet and sheet source from the hot gases passing out from the furnace beneath the cover-tiles 7 and 8, and from the radiated heat from the molten glass, and also absorb heat from the molten glass as it is being drawn into the sheet, thus lowering its temperature and increasing its tenacity, so that a more rapid drawing rate is made possible.

The two improved coolers 9 and 10, as shown more particularly in Figs. 1 and 4, are substantially identical with one another and a description of one will suffice for both. The main body portion of the cooler is a hollow cylinder 11, formed of some suitable metal, preferably brass or bronze, the respective ends of the cylinder being attached to and closed by suitable plug members 12 and 13, formed integrally with the tapered end castings 14 and 15, respectively.

The space enclosed by the hollow cylinder 11 and the end plugs 12 and 13 is normally filled with water or some other suitable cooling fluid. A stationary pipe 16, of relatively small diameter, extends in through one end of the cylinder and has its inner closed end 17 rotatably mounted in the socket 18 in end plug 12. The other end portion of pipe 16 passes through the closed end 19 of a somewhat larger stationary pipe 20 which serves as an outlet for the fluid. The outer end 21 of the tapered end casting 15 is rotatably mounted on this stationary pipe 20, and the end plug 13 also rotates about this pipe 20, and is provided with a stuffing-box 22 for preventing the escape of the cooling fluid at this joint. Suitable openings such as 23 in the end casting are provided whereby access may be had to the stuffing-box 22 for adjusting same. The water or other cooling fluid passes into pipe 16 through a suitable feed connection 24 at its outer end, and is discharged into the cooler casing through a plurality of downwardly directed outlet ports or spouts 25. These spouts 25 will be so distributed along the length of pipe 16 as to give proper and uniform cooling effect at all points throughout the length of the cooler. Preferably, the spouts 25 are grouped somewhat closer together toward the closed end of the cooler, that is the end most remote from that through which the liquid passes out. This will necessitate a longer passage through the cooler of a major portion of the water, thus securing the maximum cooling effect therefrom. As the cooling fluid becomes heated, it will rise to the top of the cylinder and the surplus will flow out through the open upwardly extending drain-pipes 26 at the inner end of outlet pipe 20. The water flows from the outer end of this pipe into a trough 27, as shown at the right hand side of Fig. 1.

Means is provided at one side of the apparatus, as shown in Figs. 2 and 5, and at the left of Fig. 1, for supporting and rotating the cooler bodies. A pair of similar bearing blocks 28 and 29 are slidably mounted on a supporting plate 30. Adjusting screws 31 extend through bracket arms 32, at the ends of plate 30, and by suitably manipulating the adjusting nuts 33, the bearing blocks 28 and 29 may be individually adjusted toward or from one another along the supporting plate 30. A short shaft 34 rotatably carried in bearing 28, is formed at its inner end with a supporting stud 35 having a key or feather 36. The stud 35 and key 36 fit a corresponding socket 37 in the end of the tapered end casting 14 of cooler 10. A similar shaft 38 is mounted in bearing 29 and has a similar removable connection with the end of cooler 9. Similar bevel gears 39 are keyed to the outer ends of shafts 34 and 38. A horizontal driving shaft 40 is slidably mounted in bracket extensions 41 and 42 extending from the bearing blocks 28 and 29, respectively. Shaft 40 is connected through universal joint 43 with a second driving shaft 44, which in turn is suitably driven from some source of power. Bevel pinions 45 meshing with the bevel gears 39 are keyed to but slidable on the drive shaft 40. Preferably, the pinions 45 mesh with opposite sides of the bevel gears 39 so that the coolers will be rotated in opposite directions, as indicated by the arrows in Fig. 4. However, if found desirable, the direction of rotation of either cooler may be reversed from that shown by reversing the position of pinion 45 on shaft 40. It will be noted that the bearing blocks 28 and 29, and hence the coolers 9 and 10, may be adjusted toward or from one another without disengaging the rotating driving connections just described. Supporting plate 30 is carried at its ends upon vertical screws 46 and 47, extending down through base plate 48 which rests on the fixed angle beams 49 at the side of the machine. The adjustable nuts 50 on the screws 46 and 47 rest upon the upper surface of base plate 48, and by manipulating these nuts 50 either end or both ends of supporting plate 30 may be raised or lowered to adjust the vertical position of either or both of the coolers 9 and 10. Supporting screw 46 is pivoted directly to the plate 30 as at 51, while the other supporting screw 47 has a pin-and-slot connection 52 with plate 30, whereby freedom is permitted for the independent adjustments just mentioned.

At the other side of the machine, as shown in Fig. 3 and at the right of Fig. 1, a pair of similar supporting clamps or collars 53 are slidably mounted upon the supporting plate 54. These collars 53 are quite similar to the bearings 28 and 29 previously described, although the stationary shafts 20 which are mounted in these collars do not rotate therein but are merely clamped and supported thereby. The lateral adjusting mechanism 55 for the clamps 53 and the vertical adjusting mechanisms 56 for supporting plate 54, are quite similar to the corresponding adjusting mechanisms described in connection with the rotating means at the other side of the machine. Each clamp 53 comprises a lower stationary half 57 to which is hinged at 58 an upper half 59. A clamping bolt 60 engages in a slotted ear 61 at that side of the swinging clamp 59 opposite from hinge 58.

When for any reason it is desired to remove one of the coolers, the retaining bolt 60 is disengaged and the pivoted upper half of clamp 53 is swung open. The cooler may now be lifted out of this clamp and drawn away from the supporting stud 35 at the opposite side of the machine. In this way the cooler may be readily removed without disconnecting any of the feed connections for the cooling fluid. Another cooler, already connected up with the cooling system may be slipped into place by sliding the far end of the cooler onto the supporting stud 35 and clamping the end of pipe 20 in the collar 53.

Obviously, the construction shown could be modified, if found desirable, so as to have the end castings 15 of the coolers extend through the clamps 53 and have a rotatable bearing therein. In such a construction these clamps 53 would become bearing blocks similar to bearings 28 and 29 at the other side of the machine.

A somewhat simpler form of cooler is shown in Fig. 6. In this case the outlet pipe 20 is eliminated and the inlet pipe 16 for the cooling fluid is turned so that the outlets 25 project upwardly and the water or other fluid will be sprayed upwardly against the top of the cylinder 11. This cooling fluid will fall back into the lower portion of the cylinder, and the overflow will pass out around pipe 16 through the opening 62 in the end casting 63. It will be noted that in this form of cooler, the cylinder is only about half full of the cooling liquid, whereas in the form first described the cylinder is normally substantially filled with this liquid.

In Fig. 7 is indicated a modified form of inlet pipe 16. In this form, the pipe 16 is provided with a continuous narrow slot 64, which takes the place of the outlet spouts 25 previously described. This slot 64 will be so narrow that the head of water within pipe 16 will provide a continuous flow through the slot from one end thereof to the other. Preferably, the slot 64 will be formed somewhat wider adjacent the closed end of the pipe as at 65, so as to enforce a flow of the greater portion of the cooling fluid to the closed end of the cylinder.

Fig. 8 shows a modified form of cylindrical casing for the cooler body. In this case the cylinder is provided with a plurality of longitudinal ribs 65, which not only increase the strength of the cylinder, but also greatly increase the outer area thereof and hence increase its heat absorbing capacity. This fluted structure will not ordinarily be necessary but may be used where a cooler having greater strength or greater cooling capacity is desired.

Many of the advantages of this improved cooler will be apparent from the foregoing description. Since a body of circular cross section has a maximum volume, it will be apparent that the capacity of this cooler for cooling fluid, and hence its cooling efficiency, will be at a maximum. Also this form of cooler has no dead corners in which deposits from the cooling fluid may accumulate, and since the casing is constantly rotating, there will be a continual movement of the fluid along all portions of the interior of the cylinder so that the casing will be substantially self-cleaning. Since a new face of the cooler body is being constantly presented adjacent the molten glass, whereas the other portions of the cooler are during a large portion of the time directed away from this molten glass whereby they may cool more rapidly, it will be apparent that all portions of the cooler may be maintained at a lower temperature, and hence the cooling efficiency of the shield or cooler is increased. Also, the constant movement of the enclosing casing, as well as the cooling fluid therein, will equalize and distribute any inequalities that may exist in the temperatures of the casing or fluid at different points throughout the cooler, whereby a more even and uniform temperature may be maintained at all points across the width of the sheet. Furthermore, the hollow tubular form of the cooler gives it greater structural strength, and since this tube is being constantly rotated, the supporting stresses are constantly shifted, and the tendency of any body supported only at its ends to sag at the center is overcome. Also the condensation of water on the upper portions of a stationary cooler, either from the air or by sweating through the walls of the cooler, is eliminated since all portions of the rotary cooler surface are successively presented adjacent the hot molten glass, where the temperature is such that condensation is impossible. Consequently, there will be no corrosion of the outer surfaces of the cooler, and hence no occasion for these outer surfaces to flake off into the molten glass.

Claims:

1. In an apparatus for drawing sheet glass, a pair of rotatable cylindrical coolers at opposite sides of the sheet, each rotary cylindrical cooler, provided with a longitudinally fluted outer surface, which is arranged out of contact with the glass.

2. In sheet glass drawing apparatus, a pair of similar cylindrical coolers positioned adjacent but out of contact with the respective sides of the sheet, and means for simultaneously rotating the coolers in opposite directions.

3. In sheet glass drawing apparatus, a pair of similar cylindrical coolers positioned adjacent but out of contact with the respective sides of the sheet, and means for simultaneously rotating the coolers.

4. In sheet glass drawing apparatus, a pair of similar cylindrical coolers positioned adjacent but out of contact with the respective sides of the sheet, means for simultaneously rotating the coolers, and means for independently adjusting the coolers toward or from the sheet without effecting the rotating connections.

5. In sheet glass drawing apparatus, a pair of similar cylindrical coolers positioned adjacent but out of contact with the respective sides of the sheet, means for simultaneously rotating the coolers, and means for adjusting the coolers in two directions.

6. In sheet glass drawing apparatus, a pair of similar cylindrical coolers positioned adjacent but out of contact with the respective sides of the sheet, means for constantly renewing the supply of cooling fluid within each cooler, and means for simultaneously rotating the coolers in opposite directions.

7. In sheet glass drawing apparatus, a pair of similar cylindrical coolers positioned adjacent but out of contact with the respective sides of the sheet, means for constantly renewing the supply of cooling fluid within each cooler, means for simultaneously rotating the coolers, and means for independently adjusting the coolers toward or from the sheet without effecting the rotating connections.

8. In sheet glass apparatus, a pair of rotatable coolers positioned adjacent the respective sides of the sheet, said coolers being arranged out of contact with the glass.

9. In sheet glass apparatus, a pair of similar coolers positioned adjacent the respective sides of the sheet, said coolers being arranged in close proximity but out of contact with the glass and means extending longitudinally within said coolers which supply a cooling fluid to the interiors thereof.

10. In sheet glass apparatus, a pair of similar coolers positioned adjacent the respective sides of the sheet, said coolers being arranged in close proximity but out of contact with the glass, means to rotate the coolers, and means to permit circulation of a cooling medium therethrough.

11. In sheet glass apparatus, a pair of similar cylindrical coolers positioned adjacent the respective sides of the sheet, said coolers being arranged in close proximity but out of contact with the glass, means to rotate the coolers, and means to permit circulation of a cooling medium therethrough.

12. In sheet glass apparatus, a pair of similar cylindrical coolers positioned adjacent the respective sides of the sheet, said coolers being arranged in close proximity but out of contact with the glass, means to rotate the coolers in opposite directions, and means to permit circulation of a cooling medium therethrough.

13. In an apparatus for drawing sheet glass, a rotary cooler, and non-rotary means extending longitudinally within the cooler for supplying a cooling fluid to the interior thereof.

14. In an apparatus for drawing sheet glass, a rotary cylindrical cooler, and non-rotary means carried by and extending longitudinally within the cooler for supplying a cooling fluid to the interior thereof.

15. In an apparatus for drawing sheet glass, a rotatably and slidably mounted cylindrical cooler arranged in proximity to but out of contact with the glass, and means for enforcing a circulation of cooling fluid therethrough.

16. In an apparatus for drawing sheet glass, a rotatably and slidably mounted cylindrical cooler, and non-rotary means extending longitudinally within the cooler for supplying a cooling fluid to the interior thereof.

17. In an apparatus for drawing sheet glass, a rotary cylindrical cooler arranged in proximity to but out of contact with the glass, and means for moving the cooler bodily in a horizontal plane.

18. In an apparatus for drawing sheet glass, a rotary cylindrical cooler, non-rotary means extending longitudinally within the cooler for supplying a cooling fluid to the interior thereof, and means for moving the said cooler bodily in a horizontal plane.

Signed at Toledo, in the county of Lucas, and State of Ohio, this 27th day of November, 1923.

JOSEPH A. REECE.